US010596880B2

United States Patent
Kolda et al.

(10) Patent No.: US 10,596,880 B2
(45) Date of Patent: Mar. 24, 2020

(54) METHOD AND SYSTEM FOR CONTROLLING THE RELEASE OF HEAT BY A TEMPERATURE CONTROL UNIT

(71) Applicant: THERMO KING CORPORATION, Minneapolis, MN (US)

(72) Inventors: Michal Kolda, Prague (CZ); Václav Rajtmajer, Beroun (CZ); Michal Hegar, Prague (CZ); Markéta Kopecká, Vsetin (CZ); Antonín Ryska, Prague (CZ)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 15/578,099

(22) PCT Filed: May 25, 2016

(86) PCT No.: PCT/US2016/034054
§ 371 (c)(1),
(2) Date: Nov. 29, 2017

(87) PCT Pub. No.: WO2016/196109
PCT Pub. Date: Dec. 8, 2016

(65) Prior Publication Data
US 2018/0147916 A1    May 31, 2018

Related U.S. Application Data
(60) Provisional application No. 62/168,332, filed on May 29, 2015.

(51) Int. Cl.
*B60H 1/32*    (2006.01)
*B60H 1/00*    (2006.01)
(Continued)

(52) U.S. Cl.
CPC ........... *B60H 1/323* (2013.01); *B60H 1/0065* (2013.01); *B60H 1/00492* (2013.01);
(Continued)

(58) Field of Classification Search
CPC .... F25B 6/02; F25B 7/00; F03B 7/003; Y02E 60/147
See application file for complete search history.

(56) References Cited

U.S. PATENT DOCUMENTS 5,320,166 A    6/1994 Swenson
5,553,662 A    9/1996 Longardner et al.
(Continued)

FOREIGN PATENT DOCUMENTS

GB    2237625    5/1991
JP    02220923  A  *  9/1990
(Continued)

OTHER PUBLICATIONS

International Search Report and Written Opinion issued in International Application No. PCT/US2016/034054 dated Sep. 9, 2016 (10 pages).
(Continued)

*Primary Examiner* — Frantz F Jules
*Assistant Examiner* — Lionel Nouketcha
(74) *Attorney, Agent, or Firm* — Hamre, Schumann, Mueller & Larson, P.C.

(57) ABSTRACT

Methods and systems for controlling the release of heat by a temperature control unit are provided. In one embodiment, the method includes monitoring a heat release condition of the temperature control unit. This method also includes determining, via a controller, whether to release the heat generated by the temperature control unit to an ambient environment outside of the internal space based on the heat release condition. Also, this method includes operating a
(Continued)

HVAC circuit of the temperature control unit in a heat release mode when the controller determines that the heat generated by the temperature control unit is to be released to the ambient environment outside the internal space. Further, this method includes operating the HVAC circuit of the temperature control in a heat storage mode when the controller determines that the heat generated by the HVAC unit is not to be released to the ambient environment outside the internal space.

13 Claims, 4 Drawing Sheets

(51) Int. Cl.
    *F03B 7/00*     (2006.01)
    *F25B 6/02*     (2006.01)
    *F25B 7/00*     (2006.01)

(52) U.S. Cl.
    CPC ....... B60H 1/00771 (2013.01); B60H 1/3227 (2013.01); *F03B 7/003* (2013.01); *F25B 6/02* (2013.01); *F25B 7/00* (2013.01); *Y02B 30/72* (2013.01); *Y02E 60/147* (2013.01)

(56) References Cited

U.S. PATENT DOCUMENTS

| | | | |
|---|---|---|---|
| 5,680,898 | A | 10/1997 | Rafalovich et al. |
| 5,755,104 | A | 5/1998 | Rafalovich et al. |
| 6,668,567 | B2 | 12/2003 | Levenduski et al. |
| 6,705,101 | B2 * | 3/2004 | Brotz ...................... B60H 1/00 62/198 |
| 7,669,647 | B2 * | 3/2010 | Tsubone ............. B60H 1/00492 123/142.5 R |
| 7,788,941 | B2 | 9/2010 | Campbell et al. |
| 8,209,073 | B2 | 6/2012 | Wijaya et al. |
| 9,599,395 | B2 * | 3/2017 | Yamashita ................ F25B 6/04 |
| 2003/0014987 | A1 * | 1/2003 | Levenduski ............ F25B 39/04 62/185 |
| 2003/0167925 | A1 * | 9/2003 | Aikawa ............... B60H 1/00492 96/126 |
| 2006/0231233 | A1 | 10/2006 | Farid et al. |
| 2009/0314023 | A1 | 12/2009 | Mauhe et al. |
| 2011/0162368 | A1 | 7/2011 | Schroder et al. |
| 2011/0167854 | A1 | 7/2011 | Edwards et al. |
| 2011/0232890 | A9 * | 9/2011 | Gering ............... B60H 1/00278 165/202 |
| 2012/0111036 | A1 | 5/2012 | Campbell et al. |
| 2013/0074531 | A1 * | 3/2013 | Parsonnet ............... F25D 16/00 62/117 |
| 2014/0097261 | A1 | 4/2014 | Blumenstock et al. |
| 2014/0262126 | A1 | 9/2014 | Ishii et al. |
| 2014/0309788 | A1 * | 10/2014 | Blum ..................... G01S 19/51 700/276 |
| 2015/0135743 | A1 | 5/2015 | Dobbs |
| 2015/0314671 | A1 * | 11/2015 | Rajtmajer ............ B60H 1/3232 62/99 |

FOREIGN PATENT DOCUMENTS

| | | | |
|---|---|---|---|
| JP | 2003004321 A | * | 1/2003 |
| KR | 20110055348 | | 5/2011 |
| KR | 101144637 | | 5/2012 |
| WO | 2012101110 | | 8/2012 |
| WO | 2012169764 | | 12/2012 |
| WO | 2013088190 | | 6/2013 |
| WO | WO 2013088190 A1 * | 6/2013 | ......... B60H 1/00492 |

OTHER PUBLICATIONS

European Search Report issued in European Application No. 16804023.6 dated Aug. 23, 2018 (8 pages).

* cited by examiner

METHOD AND SYSTEM FOR CONTROLLING THE RELEASE OF HEAT BY A TEMPERATURE CONTROL UNIT

FIELD

The embodiments disclosed herein relate generally to a temperature control unit (e.g., a heating, ventilation, and air conditioning (HVAC) unit, a refrigeration unit, etc.). More particularly, the embodiments relate to methods and systems for controlling the release of heat by a temperature control unit.

BACKGROUND

Mobile temperature control units (e.g., HVAC units, refrigeration units, etc.) are used to condition air within an internal space of a mobile transport (e.g., a railway car, a bus, etc.). When temperature control (e.g., cooling) is required in the mobile transport, the temperature control unit is configured to perform a heat transfer process that transfers heat away from the internal space of the mobile transport to an ambient environment outside of the internal space.

SUMMARY

The embodiments described herein are directed to a temperature control unit (e.g., an HVAC unit, a refrigeration unit, etc.). In particular, the embodiments described herein are directed to methods and systems for controlling the release of heat by a temperature control unit.

The embodiments described herein allow a temperature control unit to store heat generated by the temperature control unit when providing temperature control of an internal space.

The embodiments described herein allow the temperature control unit to decrease the temperature of a refrigerant on a high temperature side of an HVAC circuit while preventing/postponing the release of heat generated by the temperature control unit to an ambient environment.

In some instances, a mobile temperature control unit may be required to operate (e.g., provide temperature control of an internal space) in a location/zone in which immediate release of heat generated by the mobile temperature control unit to the ambient environment is not possible or is prohibited.

Accordingly, the embodiments described herein can provide continuous temperature control of an internal space for a mobile temperature control unit regardless of whether the mobile temperature control unit is operating in a zone with limited or prohibited heat release to an ambient environment.

In one embodiment, a method for controlling the release of heat generated by a temperature control unit to an ambient environment outside an internal space is provided. The method includes monitoring a heat release condition of the temperature control unit. This method also includes determining, via a controller, whether to release the heat generated by the temperature control unit to an ambient environment outside of the internal space based on the heat release condition. Also, this method includes operating an HVAC circuit of the temperature control unit in a heat release mode when the controller determines that the heat generated by the temperature control unit is to be released to the ambient environment outside the internal space. Further, this method includes operating the HVAC circuit of the temperature control in a heat storage mode when the controller determines that the heat generated by the HVAC unit is not to be released to the ambient environment outside the internal space.

In another embodiment, an HVAC circuit for a temperature control unit is provided. The HVAC circuit includes a phase change material (PCM) reservoir. The HVAC circuit is configured to operate in a heat storage mode, whereby heat generated by the temperature control unit for providing temperature control within the internal space is stored in the PCM reservoir. Also, the HVAC circuit is configured to operate in a heat release mode, whereby the heat generated by the temperature control unit for providing temperature control within the internal space is released to an ambient environment outside of the internal space.

In yet another embodiment, a temperature control unit for providing temperature control within an internal space is provided. The temperature control unit includes an HVAC circuit and a controller. The HVAC circuit includes a phase change material (PCM) reservoir. The HVAC circuit is configured to operate in a heat storage mode, whereby heat generated by the temperature control unit for providing temperature control within the internal space is stored in the PCM reservoir. The HVAC circuit is also configured to operate in a heat release mode, whereby the heat generated by the temperature control unit for providing temperature control within the internal space is released to an ambient environment outside of the internal space. The controller is configured to control the HVAC circuit to operate in the heat storage mode and to operate in the heat release mode.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments described herein are directed to a temperature control unit. In particular, the embodiments described herein are directed to methods and systems for controlling the release of heat by a temperature control unit.

The embodiments described herein can be used to provide temperature control in an internal space of, for example, a railway car, a bus, a refrigerated transport unit, etc. In particular, the embodiments described herein can provide temperature control in the internal space using a temperature control unit regardless of whether heat generated by the temperature control unit can be released to the ambient environment outside of the internal space.

A "temperature control unit" is an apparatus configured to provide temperature control within an internal space of, for example, a railway car, a bus, a refrigerated transport unit, etc. In the embodiments disclosed herein, the temperature control unit includes an HVAC circuit. A temperature control unit can be, for example, an HVAC unit, a refrigeration unit, etc. Also, in some embodiments, the temperature control unit can be a mobile temperature control unit that is configured to provide temperature control within an internal space of, for example, a railway car, a bus, a trailer, etc., during transport.

A "phase change material" (PCM) includes, for example, a material that can store or release a large amount of energy upon a phase change (e.g., from a solid to a liquid, a liquid to a solid, etc.) while remaining at about a constant temperature. A PCM can gradually absorb heat (e.g., from an internal space, etc.) while remaining at about a constant temperature during a phase transformation from a solid state into a liquid state.

A PCM can, for example, be used to store heat generated by a mobile temperature control unit when, for example, the generated heat is prevented from being released to the ambient environment outside of the internal space. For example, when a mobile temperature control unit is travelling e.g., underground, through a tunnel, etc., the transport using the mobile temperature control unit may not provide ventilation to allow heat generated by the mobile temperature control unit to be released into the ambient environment outside of the internal space. In these instances, the embodiments described herein can allow the mobile temperature control unit to continue to run and provide temperature control within the internal space regardless of whether the heat generated by the mobile temperature control unit can be released to the ambient environment outside of the internal space.

Figure 1:
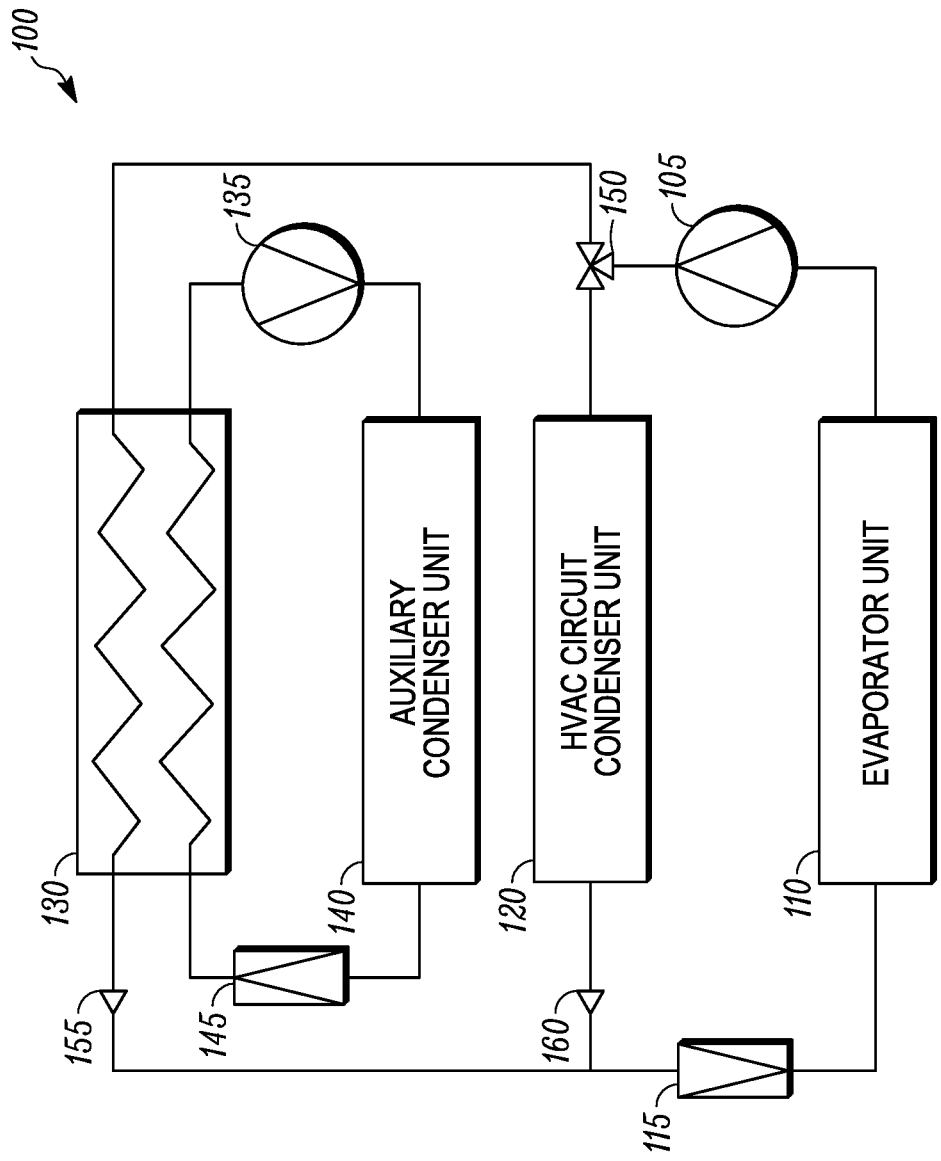
FIG. 1 illustrates a schematic diagram of an HVAC circuit for a mobile HVAC control unit, according to one embodiment.
Figure 2A:
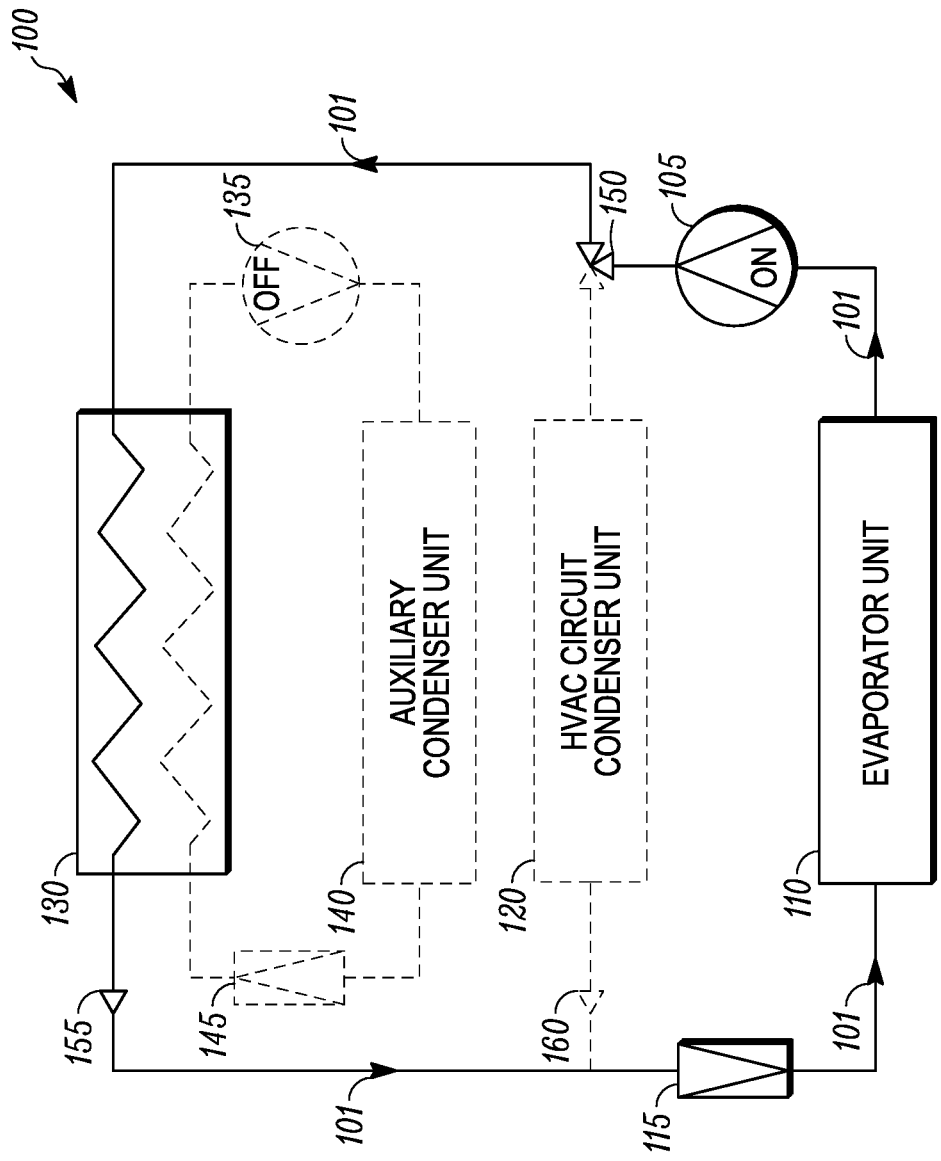
FIG. 2A illustrates a schematic diagram of the HVAC circuit shown in FIG. 1 when operating in a heat storage mode, according to one embodiment.
Figure 2B:
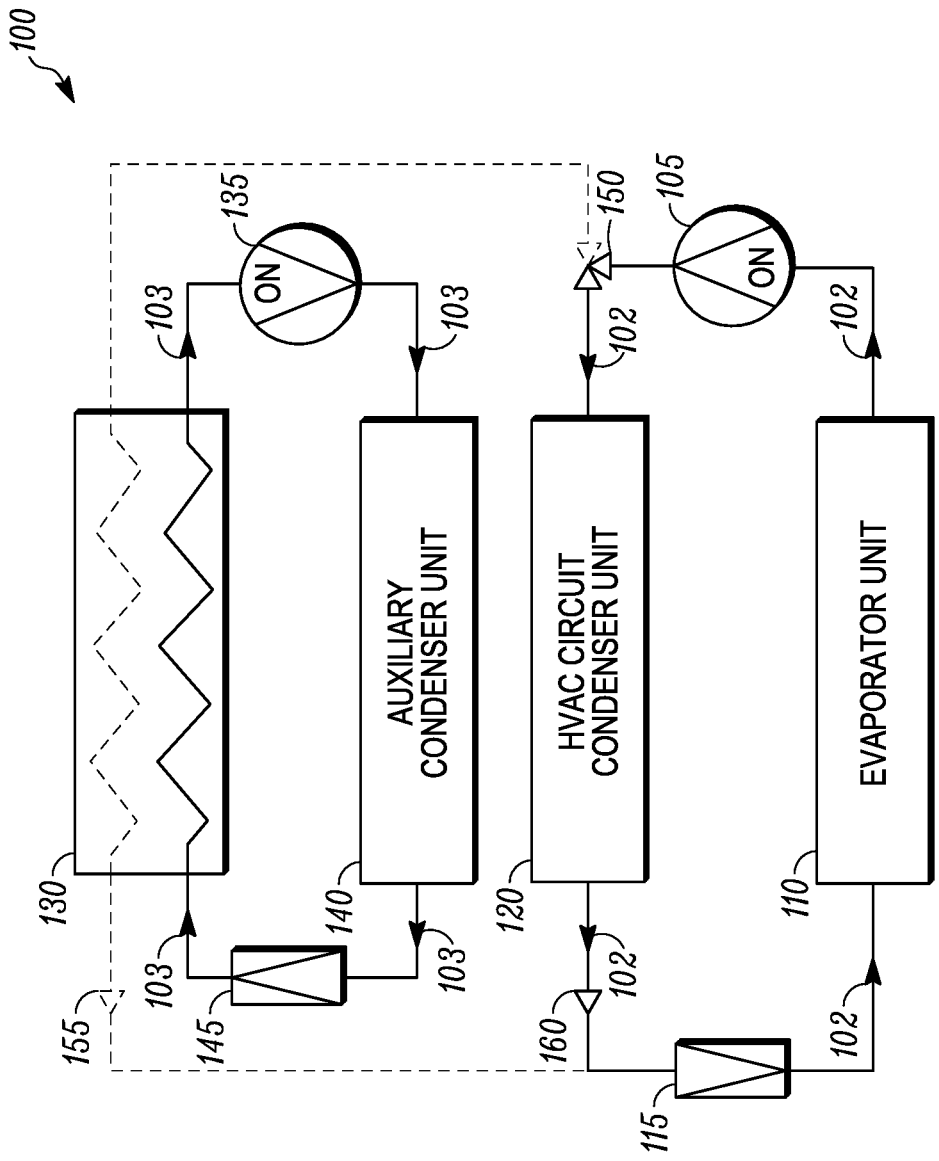
FIG. 2B illustrates a schematic diagram of the HVAC circuit shown in FIG. 1 when operating in a heat release mode, according to one embodiment.
Figure 3:
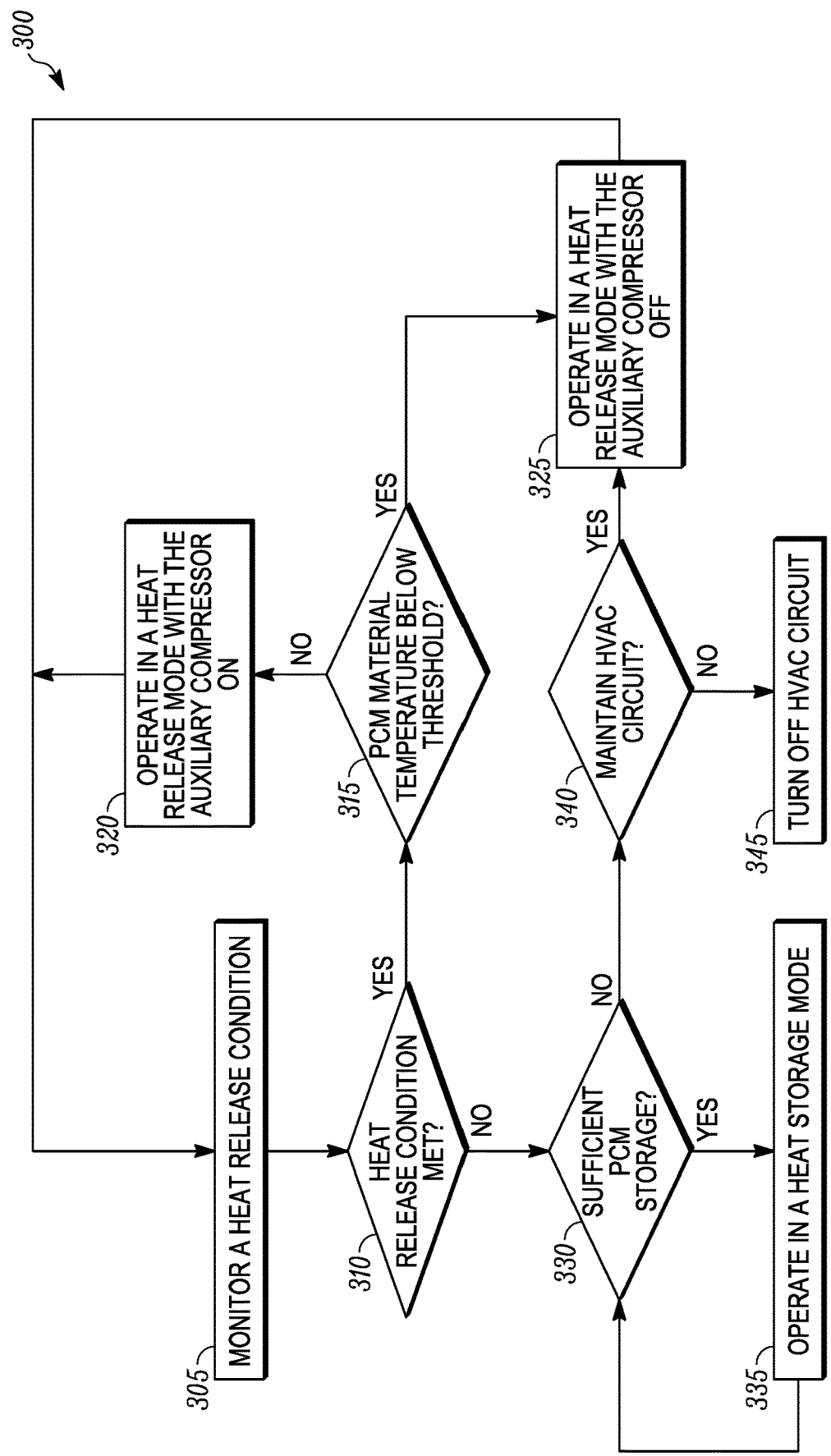
FIG. 3 illustrates a flowchart of a method for controlling the release of heat by a mobile HVAC unit having the HVAC circuit, according to one embodiment.

It will be appreciated to one skilled in the art that while FIGS. 1-3 are directed to a mobile HVAC unit, the embodiments described herein can apply for any type of stationary or mobile temperature control unit (e.g., a stationary or mobile refrigeration unit, a stationary or mobile HVAC unit, etc.).

FIG. 1 illustrates a schematic diagram of an HVAC circuit 100 for a mobile HVAC unit, according to one embodiment. The HVAC circuit 100 allows the mobile HVAC unit to provide temperature control within an internal space while also controlling when the mobile HVAC unit can release heat generated by the HVAC circuit 100 into the ambient environment.

The HVAC circuit 100 includes an HVAC circuit compressor 105, an evaporator unit 110, an HVAC circuit expansion device 115, and an HVAC circuit condenser unit 120. The HVAC circuit 100 also includes a phase change material (PCM) reservoir 130, an auxiliary compressor 135, an auxiliary condenser unit 140 and an auxiliary expansion device 145. Also, the HVAC circuit 100 includes a three-way valve 150, an auxiliary check valve 155 and an HVAC circuit check valve 160. The HVAC circuit 100 can be controlled, for example, by a controller (not shown) of the mobile HVAC unit.

The HVAC circuit compressor 105 is configured to compress a first refrigerant and direct the first refrigerant through the HVAC circuit 100 in order to operate a refrigeration cycle that can provide temperature control within the internal space. The HVAC circuit compressor 105 can be a digital scroll compressor, a reciprocating compressor, a screw compressor, a positive displacement compressor, a centrifugal compressor, or other suitable type of compressor for compressing a refrigerant.

The evaporator unit 110 can include an evaporator heat exchanger (not shown) and one or more evaporator fans. The evaporator unit 110 is configured to allow the first refrigerant, received from the HVAC circuit expansion device 115, to evaporate from a liquid to a gas by absorbing heat from the internal space and thereby provide cooling to the internal space.

The HVAC expansion device 115 is configured to receive the first refrigerant in the form of a liquid from either the PCM reservoir 130 or the HVAC circuit condenser unit 120 and is configured to restrict the flow of the first refrigerant in the form of a gas to the evaporator unit 110. The HVAC circuit expansion device 115 can be an expansion valve.

The HVAC circuit condenser unit 120 can include a condenser heat exchanger (not shown) and one or more condenser fans. The HVAC circuit condenser unit 120 is configured to allow the first refrigerant, received from the HVAC circuit compressor 105, to transform from a gas to a liquid by releasing heat absorbed by the first refrigerant (while passing through the evaporator unit 110) into the ambient environment outside of the internal space.

The PCM reservoir 130 stores a PCM material and includes a PCM heat exchanger (not shown). The PCM material can be any fluid which has a solid-liquid transition (melting) point in a rage between about −40° C. and about 100° C. and can be selected based on the requirements and configuration of the mobile HVAC unit. In one example, the PCM material can be a fluid that has a phase change transition point of about 28° C. The PCM can store heat in a transition phase using a latent heat (e.g., heat of fusion). The PCM can also store heat in a liquid phase. The amount and type of PCM material stored in the PCM reservoir 130 can be modified as required to meet the operation conditions required by the mobile HVAC unit. For example, when the mobile HVAC unit is required to provide temperature control for a railway car when the railway car is in a tunnel for a set period of time (e.g., 30 minutes), the type and amount of PCM material stored in the PCM reservoir 130 can be selected in order to allow mobile HVAC unit to provide temperature control within an internal space of the railway car without releasing heat generated by the mobile HVAC unit into the ambient environment outside of the internal space for the set period of time.

The PCM reservoir 130 is configured to allow the first refrigerant, in the form of a gas, to pass through the PCM heat exchanger and to condensate from a gas to a liquid by absorbing heat released by the first refrigerant (while passing through the evaporator unit 110) into the PCM material. Accordingly, the PCM material can transform from a solid into a liquid.

The PCM reservoir 130 is also configured to allow the second refrigerant, in the form of a liquid, to pass through the PCM heat exchanger so as evaporate from a liquid to a gas by absorbing heat from the PCM material. Accordingly, the PCM material can transform from a liquid into a solid.

The auxiliary compressor 135 is configured to compress a second refrigerant and direct the second refrigerant through the HVAC circuit 100 in order to operate a refrigeration cycle that can release heat stored in the PCM reservoir 130 into the ambient environment outside of the internal space. The auxiliary compressor 135 can be a digital scroll compressor, a reciprocating compressor, a screw compressor, a positive displacement compressor, a centrifugal compressor, or other suitable type of compressor for compressing a refrigerant. Also, in some embodiments, the first refrigerant and the second refrigerant are the same type of refrigerant. In other embodiments, the first refrigerant is a different type of refrigerant from the second refrigerant.

The auxiliary condenser unit 140 can include a condenser heat exchanger (not shown) and one or more condenser fans. The auxiliary condenser unit 140 is configured to allow the second refrigerant, received from the auxiliary compressor 135, to transform from a gas to a liquid by absorbing heat released by the second refrigerant (while passing through the PCM reservoir 130) into the ambient environment outside of the internal space.

While the auxiliary condenser unit 140 and the HVAC circuit condenser unit 120 are shown as separate units of the HVAC circuit 100, it will be appreciated that in some embodiments, the components of the respective units may be shared. For example, in one embodiment, the auxiliary condenser unit 140 and the HVAC circuit condenser unit 120 can both share and use the same condenser fans.

The auxiliary expansion device 145 is configured to receive the second refrigerant in the form of a liquid from the auxiliary condenser unit 140 and is configured to restrict the flow of the second refrigerant in the form of a gas to the PCM reservoir 130. The auxiliary expansion device 145 can be an expansion valve.

The HVAC circuit 100 is configured to operate in a heat storage mode (shown in FIG. 2A) and a heat release mode (shown in FIG. 2B). The controller can be configured to control the HVAC circuit 100 so as to operate in the heat storage mode or the heat release mode.

FIG. 2A illustrates a schematic diagram of the HVAC circuit 100 when operating in the heat storage mode, according to one embodiment. In the heat storage mode, the HVAC circuit compressor 105 is configured to operate in an ON state and the auxiliary compressor 135 is configured to operate in an OFF state. The three-way valve 150 is configured to allow high pressure refrigerant gas from the HVAC circuit compressor 105 to pass through the PCM reservoir 130. The auxiliary check valve 155 is configured to be in an OPEN state to allow high pressure liquid refrigerant that passes through the PCM reservoir 130 to be directed to the HVAC circuit expansion device 115. The HVAC circuit check valve 160 is configured to be in a CLOSED state so that along with the configuration of the three-way valve 150, high pressure gas from the HVAC circuit compressor 105 is prevented from passing through the HVAC circuit condenser unit 120. Accordingly, the first refrigerant passes through the HVAC circuit 100 via a heat storage path 101.

In operation (as shown by the heat storage path 101), the HVAC circuit compressor 105 is configured to compress the first refrigerant and direct the first refrigerant, in the form of a gas, to the PCM reservoir 130. The PCM heat exchanger of the PCM reservoir 130 is configured to allow heat from the first refrigerant to transfer to the PCM material and is configured to direct the first refrigerant, in the form of a liquid, to the HVAC circuit expansion device 115. The PCM material is configured to absorb the heat from the first refrigerant and transform from a solid to a liquid. The first refrigerant then passes through the HVAC circuit expansion device 115 to the evaporator unit 110. The evaporator unit 110 allows the first refrigerant to absorb heat from the internal space, thereby transforming the first refrigerant from a liquid to a gas, and then directs the first refrigerant (in the form of a gas) back to the HVAC circuit compressor 105. Accordingly, the HVAC circuit 100 can provide temperature control within the internal space without releasing heat generated by the HVAC circuit 100 into the ambient environment outside of the internal space.

FIG. 2B illustrates a schematic diagram of the HVAC circuit 100 when operating in the heat release mode, according to one embodiment. In the heat release mode, the HVAC circuit compressor 105 is configured to operate in an ON state. The three-way valve 150 is configured to allow high pressure refrigerant gas from the HVAC circuit compressor 105 to pass through the HVAC circuit condenser unit 120. The auxiliary valve 155 is configured to be in a CLOSED state so that along with the configuration of the three-way valve 150, high pressure gas from the HVAC circuit compressor 105 is prevented from passing through the PCM reservoir 130. The HVAC circuit check valve 160 is configured to be in an OPEN state to direct high pressure liquid refrigerant from the HVAC circuit condenser unit 120 to the HVAC circuit expansion device 115.

As shown in FIG. 2B, in some embodiments, the auxiliary compressor 135 is also configured to operate in an ON state to allow refrigerant to pass through the auxiliary condenser unit 140, the auxiliary expansion device 145 and the PCM reservoir 130. Accordingly, the first refrigerant passes through the HVAC circuit 100 via an HVAC heat release path 102 and the second refrigerant can pass through the HVAC circuit 100 via a PCM heat release path 103.

In operation (as shown by the HVAC heat release path 102), the HVAC circuit compressor 105 is configured to compress the first refrigerant and direct the first refrigerant, in the form of a gas, to the HVAC circuit condenser unit 120. The HVAC circuit condenser unit 120 is configured to allow heat from the first refrigerant to transfer to the ambient environment outside the internal space and is configured to direct the first refrigerant, in the form of a liquid, to the HVAC circuit expansion device 115. The first refrigerant passes, in the form of a liquid, through the HVAC circuit expansion device 115 to the evaporator unit 110. The evaporator unit 110 allows the first refrigerant to absorb heat from the internal space, thereby transforming the first refrigerant from a liquid to a gas, and then directs the first refrigerant (in the form of a gas) back to the HVAC circuit compressor 105.

Also (as shown by the PCM heat release path 103), when the auxiliary compressor 135 is configured to operate in the ON state, the auxiliary compressor 135 is configured to compress the second refrigerant and direct the second refrigerant, in the form of a gas, to the auxiliary condenser unit 140. The auxiliary condenser unit 140 is configured to allow heat from the second refrigerant to transfer to the ambient environment outside the internal space and is configured to direct the second refrigerant, in the form of a liquid, to the auxiliary expansion device 145. The second refrigerant then passes through the auxiliary expansion device 145 to the PCM reservoir 130. The second refrigerant evaporates from liquid to a gas by absorbing heat from PCM inside the PCM reservoir 130. The PCM inside the PCM reservoir 130 can thereby be cooled down and the PCM can be transformed, for example, from a liquid to a solid state. The PCM reservoir 130 then directs the second refrigerant (in the form of a gas) back to the auxiliary compressor 135. Accordingly, the HVAC circuit 100 can provide temperature control within the internal space while releasing heat generated by the HVAC circuit 100 and heat stored in the PCM reservoir 130 into the ambient environment outside of the internal space.

In some embodiments, the heat release mode can be operated such that the auxiliary compressor 135 is configured to operate in the OFF state, thereby preventing the second refrigerant from passing through the PCM heat release path 103. In these embodiments, the HVAC circuit 100 can continue to provide temperature control within the internal space while releasing heat generated by the HVAC circuit 100 into the ambient environment outside of the internal space.

FIG. 3 illustrates a flowchart of a method 300 for controlling the release of heat by a mobile HVAC unit having the HVAC circuit 100, according to one embodiment. In the embodiment disclosed herein, the mobile HVAC unit can be provided in a mobile transport (e.g., a railway car, a bus, etc.)

At 305, a controller of the HVAC circuit 100 is configured to monitor a heat release condition of the mobile HVAC unit. In some embodiments, the heat release condition can be a location of the mobile transport and/or the mobile HVAC unit. In these embodiments, the controller can determine a location of the mobile HVAC unit (e.g., via a global positioning system (GPS) device). Based on the location of the mobile HVAC unit, the controller can be configured to determine whether to it is safe to operate the HVAC circuit 100 in a heat release mode. For example, based on the location of the mobile HVAC unit or an inability to communicate, for example, with a GPS satellite, the controller can determine that the mobile HVAC unit is travelling, e.g., in a tunnel, underground, etc. whereby heat generated by the mobile HVAC unit should not (e.g., due to a law or ordinance, operation requirement of the mobile HVAC unit, etc.) be released into the ambient environment outside of the mobile HVAC unit.

In some embodiments, the heat release condition can be determined by a signal received by the mobile transport and/or the controller of the mobile HVAC unit indicating that the mobile HVAC unit is approaching and/or exiting a heat restricted heat zone (e.g., a tunnel, underground passageway, etc.). In some embodiments, the signal can be a wireless signal sent from a location external to the mobile transport, or can be a wireless signal or a mechanical switch provided from within the mobile transport and/or the mobile HVAC unit.

In some embodiments, the mobile HVAC unit can determine the heat release condition based on a sensor detecting whether the mobile transport is within an enclosed space (e.g., tunnel, underground passageway, etc.). The sensor can use, for example, ultrasound, sonar, etc. to determine whether the mobile transport is within a defined distance from, for example, a wall of the enclosed space. For example, if the mobile transport is a railway car, the sensor can be provided on the roof of the railway car and can determine whether the roof of the railway car is with a predefined distance of a ceiling of e.g., a tunnel, an underground passageway, etc.

In some embodiments, the mobile HVAC unit can determine the heat release condition based on a light detecting sensor (e.g., an optical sensor) that can be used to detect whether the mobile transport is within an enclosed space (e.g., tunnel, underground passageway, etc.). For example, in some embodiments when a railway car is within an enclosed space, the railway car may automatically switch on interior lights. The sensor can monitor whether the interior lights have been switched on, allowing the controller to determine whether the roof of the railway car is with a predefined distance of a ceiling of e.g., a tunnel, an underground passageway, etc.

In some embodiments, the mobile HVAC unit can determine the heat release condition by monitoring an ambient temperature outside of the mobile transport. For example, the controller can determine the heat release condition based on whether the HVAC circuit 100 can operate sufficiently at the monitored ambient temperature using the HVAC circuit condenser unit 120 without the directing refrigerant through the PCM reservoir 130, or whether the HVAC circuit 100 can operate more efficiently by directing refrigerant through the PCM reservoir 130.

In some embodiments, the mobile HVAC unit can determine the heat release condition based on conditions of the HVAC circuit 100. For example, the controller can determine the heat release condition based on whether the HVAC circuit 100 can operate sufficiently using the HVAC circuit condenser unit 120 without the directing refrigerant through the PCM reservoir 130, or whether the HVAC circuit 100 can operate more efficiently by directing refrigerant through the PCM reservoir 130.

In some embodiments, the heat release condition can be determined using two or more of the above described implementations.

At 310, the controller determines whether the heat release condition has been met. If the heat release condition is met, the method 300 proceeds to 315. If the heat release condition is not met, the method 300 proceeds to 330.

At 315, the controller monitors the state of the PCM material in the PCM reservoir 130 and determines whether the PCM material is below a predefined set point temperature threshold. The predefined set point temperature threshold can be defined based on whether the PCM material is sufficiently cooled, whereby operating the auxiliary compressor 135 to release heat from the PCM reservoir 130 would be inefficient and/or ineffective. If the PCM material within the PCM reservoir 130 is greater than or equal to the predefined set point temperature threshold, the method 300 proceeds to 320. If the PCM material within the PCM reservoir 130 is below the predefined set point temperature threshold, the method 300 proceeds to 325.

At 320, the controller instructs the HVAC circuit 100 to operate in the heat release mode with the auxiliary compressor 135 in the ON state. That is, the controller instructs the HVAC circuit compressor 105 and the auxiliary compressor 135 to operate in the ON state, instructs the three-way valve 150 to direct the first refrigerant from the HVAC circuit compressor 105 to the HVAC circuit condenser unit 120, and instructs the one or more fans of the auxiliary condenser unit 140, the one or more fans of the HVAC circuit condenser unit 120 and the one or more fans of the evaporator unit 110 to turn ON to absorb heat from the internal space. Accordingly, any heat stored in the PCM reservoir 130 can be released to the ambient environment outside of the internal space. The method 300 then returns to 305.

At 325, the controller instructs the HVAC circuit 100 to operate in the heat release mode with the auxiliary compressor 135 in the OFF state. That is, the controller instructs the HVAC circuit compressor 105 to operate in the ON state, instructs the three-way valve 150 to direct the first refrigerant from the HVAC circuit compressor 105 to the HVAC circuit condenser unit 120, and instructs the one or more fans of the HVAC circuit condenser unit 120 and the one or more fans of the evaporator unit 110 to turn ON to absorb heat from the internal space. Accordingly, any heat generated by the HVAC circuit 100 and carried by the first refrigerant cannot be stored in the PCM reservoir 130. The method 300 then returns to 305.

At 330, the controller determines whether the PCM material in the PCM reservoir 130 has sufficient storage to store heat carried by the first refrigerant from the HVAC circuit compressor 105. If the controller determines that the PCM material has sufficient storage, the method 300 proceeds to 335. If the controller determines that the PCM material does not have sufficient storage, the method 300 proceeds to 340.

At 335, the controller instructs the HVAC circuit 100 to operate in the heat storage mode. That is, the controller instructs the HVAC circuit compressor 105 to operate in the ON state and the auxiliary compressor 135 to operate in the OFF state, instructs the three-way valve 150 to direct the first refrigerant from the HVAC circuit compressor 105 to the PCM reservoir 130, instructs the one or more fans of the auxiliary condenser unit 140 and the one or more fans of the HVAC circuit condenser unit 120 to turn OFF, and instructs the one or more fans of the evaporator unit 110 to turn ON. Accordingly, heat carried by the first refrigerant passing through the HVAC circuit compressor 105 is absorbed by and stored in the PCM material in the PCM reservoir 130. The method 300 then returns to 330.

At 340, the controller determines whether to keep the HVAC circuit 100 in operation (e.g., keep the HVAC circuit compressor 105 ON and optionally the auxiliary compressor 135). In some embodiments, the controller can determine to keep the HVAC circuit 100 in operation when, for example, an ambient temperature outside the internal space of the mobile transport is sufficiently low that there is a limited or no advantage gained by turning the HVAC circuit 100 OFF. In some embodiments, the controller can determine to keep the HVAC circuit 100 in operation when, for example, the mobile transport is approaching an exit of a tunnel so that there is a limited or no advantage gained by turning the HVAC circuit 100 OFF. If the controller determines that the HVAC circuit 100 should be kept in operation, the method 300 proceeds to 325. If the controller determines that the HVAC circuit 100 should not be kept in operation, the method 300 proceeds to 345.

At 345, the controller instructs the HVAC circuit 100 to turn OFF. That is, the HVAC circuit compressor 105, the auxiliary compressor 135, and the one or more fans of the auxiliary condenser unit 140, the one or more fans of the HVAC circuit condenser unit 120 and the one or more fans of the evaporator unit 110 to are all turned OFF.

Aspects:

It is appreciated that any of aspects 1-21 can be combined.

1. A method for controlling the release of heat generated by a temperature control unit to an ambient environment outside an internal space, the temperature control unit configured to provide temperature control within the internal space, the method comprising:

monitoring a heat release condition of the temperature control unit;

determining, via a controller, whether to release the heat generated by the temperature control unit to an ambient environment outside of the internal space based on the heat release condition;

operating an HVAC circuit of the temperature control unit in a heat release mode when the controller determines that the heat generated by the temperature control unit is to be released to the ambient environment outside the internal space;

operating the HVAC circuit of the temperature control in a heat storage mode when the controller determines that the heat generated by the HVAC unit is not to be released to the ambient environment outside the internal space.

2. The method of aspect 1, wherein monitoring the heat release condition of the temperature control unit includes monitoring a location of the temperature control unit via a global positioning system (GPS) device.

3. The method of any of aspects 1-2, wherein operating the temperature control unit in the heat storage mode includes directing a refrigerant through the HVAC circuit via a heat storage path that includes:

directing the refrigerant from an HVAC circuit compressor through a phase change material (PCM) reservoir, through an HVAC circuit expansion device, through an evaporator unit and back to the HVAC circuit compressor.

4. The method of any of aspects 1-3, wherein operating the temperature control unit in the heat release mode includes directing a refrigerant through the HVAC circuit via a temperature control heat release path that includes:

directing the refrigerant from an HVAC circuit compressor through a temperature control condenser unit, through an HVAC circuit expansion device, through an evaporator unit and back to the HVAC circuit compressor.

5. The method of any of aspects 1-4, wherein operating the temperature control unit in the heat release mode includes directing a second refrigerant through the HVAC circuit via a PCM heat release path that includes:

directing the second refrigerant from an auxiliary compressor through an auxiliary condenser unit, through an auxiliary expansion device, through a PCM reservoir and back to the auxiliary compressor.

6. The method of any of aspects 1-5, further comprising:

determining, via the controller, whether a PCM reservoir of the HVAC circuit includes sufficient storage to store the heat generated by the temperature control unit; and turning off the HVAC circuit when the controller determines that the PCM reservoir does not include sufficient storage to store the heat generated by the temperature control unit.

7. The method of aspect 6, wherein turning off the HVAC circuit includes turning off an HVAC circuit compressor of the HVAC circuit.

8. AN HVAC circuit for a temperature control unit, the HVAC circuit comprising:

a phase change material (PCM) reservoir;

wherein the HVAC circuit is configured to operate in a heat storage mode, whereby heat generated by the temperature control unit for providing temperature control within the internal space is stored in the PCM reservoir, and wherein the HVAC circuit is configured to operate in a heat release mode, whereby the heat generated by the temperature control unit for providing temperature control within the internal space is released to an ambient environment outside of the internal space.

9. The HVAC circuit of aspect 8, further comprising:

an HVAC circuit compressor for compressing a first refrigerant;

an HVAC circuit expansion device; and an evaporator unit in thermal communication with the internal space, wherein the HVAC circuit compressor, the PCM reservoir, the HVAC circuit expansion device and the evaporator unit are connected in series when the HVAC circuit is configured to operate in a heat storage mode.

10. The HVAC circuit of aspect 9, further comprising an auxiliary check valve connected to the PCM reservoir and the HVAC circuit expansion device, wherein the auxiliary check valve is configured to direct the first refrigerant from the PCM reservoir to the HVAC circuit expansion device when the HVAC circuit is configured to operate in the heat storage mode.

11. The HVAC circuit of any of aspects 8-10, further comprising:

an HVAC circuit compressor for compressing a first refrigerant;

an HVAC circuit condenser unit in thermal communication with an ambient environment outside of the internal space;

an HVAC circuit expansion device; and an evaporator unit in thermal communication with the internal space, wherein the HVAC circuit compressor, the HVAC circuit condenser unit, the HVAC circuit expansion device and the evaporator unit are connected in series when the HVAC circuit is configured to operate in a heat release mode, and wherein the HVAC circuit condenser unit is configured to release heat to the ambient environment.

12. The HVAC circuit of aspect 11, further comprising a three-way valve connected to the HVAC circuit compressor, the PCM reservoir and the HVAC circuit condenser unit, wherein the three-way valve is configured to direct the first refrigerant to the PCM reservoir when the HVAC circuit is configured to operate in the heat storage mode, and wherein the three-way valve is configured to direct the first refrigerant to the HVAC circuit condenser unit when the HVAC circuit is configured to operate in the heat release mode.

13. The HVAC circuit of any of aspects 11-12, further comprising an HVAC circuit check valve connected to the HVAC circuit condenser unit and the HVAC circuit expansion device, wherein the HVAC circuit check valve is configured to direct the first refrigerant from the HVAC circuit condenser unit to the HVAC circuit expansion device when the HVAC circuit is configured to operate in the heat release mode.

14. The HVAC circuit of any of aspects 8-13, further comprising:

an auxiliary compressor for compressing a second refrigerant;

an auxiliary condenser unit in thermal communication with an ambient environment outside of the internal space; and an auxiliary expansion device;

wherein the auxiliary compressor, the auxiliary condenser unit, the auxiliary expansion device and the PCM reservoir are connected in series when the HVAC circuit is configured to operate in a heat release mode, and wherein the auxiliary condenser unit is configured to release heat stored in the PCM reservoir to the ambient environment.

15. A temperature control unit for providing temperature control within an internal space, the temperature control unit comprising:

an HVAC circuit including a phase change material (PCM) reservoir, wherein the HVAC circuit is configured to operate in a heat storage mode, whereby heat generated by the temperature control unit for providing temperature control within the internal space is stored in the PCM reservoir, and wherein the HVAC circuit is configured to operate in a heat release mode, whereby the heat generated by the temperature control unit for providing temperature control within the internal space is released to an ambient environment outside of the internal space; and a controller configured to control the HVAC circuit to operate in the heat storage mode and to operate in the heat release mode.

16. The temperature control unit of aspect 15, wherein the HVAC circuit includes:

an HVAC circuit compressor for compressing a first refrigerant, an HVAC circuit expansion device, and an evaporator unit in thermal communication with the internal space; and wherein the HVAC circuit compressor, the PCM reservoir, the HVAC circuit expansion device and the evaporator unit are connected in series when the HVAC circuit is configured to operate in a heat storage mode.

17. The temperature control unit of aspect 16, wherein the HVAC circuit includes an auxiliary check valve connected to the PCM reservoir and the HVAC circuit expansion device; and wherein the auxiliary check valve is configured to direct the first refrigerant from the PCM reservoir to the HVAC circuit expansion device when the HVAC circuit is configured to operate in the heat storage mode.

18. The temperature control unit of any of aspects 15-17, wherein the HVAC circuit includes:

an HVAC circuit compressor for compressing a first refrigerant, an HVAC circuit condenser unit in thermal communication with an ambient environment outside of the internal space, an HVAC circuit expansion device, and an evaporator unit in thermal communication with the internal space;

wherein the HVAC circuit compressor, the HVAC circuit condenser unit, the HVAC circuit expansion device and the evaporator unit are connected in series when the HVAC circuit is configured to operate in a heat release mode; and wherein the HVAC circuit condenser unit is configured to release heat to the ambient environment.

19. The temperature control unit of aspect 18, wherein the HVAC circuit includes a three-way valve connected to the HVAC circuit compressor, the PCM reservoir and the HVAC circuit condenser unit;

wherein the three-way valve is configured to direct the first refrigerant to the PCM reservoir when the HVAC circuit is configured to operate in the heat storage mode; and wherein the three-way valve is configured to direct the first refrigerant to the HVAC circuit condenser unit when the HVAC circuit is configured to operate in the heat release mode.

20. The temperature control unit of any of aspects 18-19, wherein the HVAC circuit includes an HVAC circuit check valve connected to the HVAC circuit condenser unit and the HVAC circuit expansion device; and wherein the HVAC circuit check valve is configured to direct the first refrigerant from the HVAC circuit condenser unit to the HVAC circuit expansion device when the HVAC circuit is configured to operate in the heat release mode.

21. The temperature control unit of any of aspects 15-20, wherein the HVAC circuit includes:

an auxiliary compressor for compressing a second refrigerant, an auxiliary condenser unit in thermal communication with an ambient environment outside of the internal space, and an auxiliary expansion device;

wherein the auxiliary compressor, the auxiliary condenser unit, the auxiliary expansion device and the PCM reservoir are connected in series when the HVAC circuit is configured to operate in a heat release mode; and wherein the auxiliary condenser unit is configured to release heat stored in the PCM reservoir to the ambient environment.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

The invention claimed is:

1. A method for controlling a release of heat generated by a temperature control unit to an ambient environment outside the temperature control unit and an internal space, the temperature control unit configured to provide temperature control within the internal space, the method comprising:
monitoring a heat release condition of the temperature control unit, wherein monitoring the heat release condition of the temperature control unit includes monitoring a location of the temperature control unit;
determining, via a controller, whether to release the heat generated by the temperature control unit when providing temperature control within the internal space to the ambient environment outside of the temperature control unit and the internal space based on the heat release condition;
operating an HVAC circuit of the temperature control unit in a heat release mode whereby the heat generated by the HVAC circuit for providing temperature control within the internal space is released to an ambient environment outside of the temperature control unit and the internal space when the controller determines that the heat generated by the temperature control unit when providing temperature control within the internal space is to be released to the ambient environment outside the temperature control unit and the internal space; and
operating the HVAC circuit of the temperature control in a heat storage mode whereby the heat generated by the HVAC circuit for providing temperature control within the internal space is stored in a phase change material (PCM) reservoir when the controller determines that the heat generated by HVAC circuit when providing temperature control within the internal space is not to be released to the ambient environment outside the temperature control unit and the internal space;
wherein the HVAC circuit includes an HVAC circuit compressor and an HVAC circuit expansion device, and
wherein operating the temperature control unit in the heat release mode includes directing a refrigerant through the HVAC circuit via an HVAC circuit heat release path that includes:
directing the refrigerant from the HVAC circuit compressor through an HVAC circuit condenser unit in thermal communication with the ambient environment outside of the temperature control unit and the internal space, through the HVAC circuit expansion device configured to receive a liquid refrigerant flow and restrict a flow of the refrigerant as a gas, through an evaporator unit and back to the HVAC circuit compressor; and
wherein operating the temperature control unit in the heat release mode includes directing a second refrigerant through the HVAC circuit via a PCM heat release path consisting of:
directing the second refrigerant from an auxiliary compressor through an auxiliary condenser unit, through an auxiliary expansion device configured to receive a liquid refrigerant flow of the second refrigerant and restrict a flow of the second refrigerant as a gas, through the PCM reservoir and back to the auxiliary compressor.

2. The method of claim 1, wherein operating the temperature control unit in the heat storage mode includes directing a refrigerant through the HVAC circuit via a heat storage path that includes:
directing the refrigerant from the HVAC circuit compressor through a phase change material (PCM) reservoir, through the HVAC circuit expansion device configured to receive a liquid refrigerant flow and restrict a flow of the refrigerant as a gas, through an evaporator unit and back to the HVAC circuit compressor.

3. The method of claim 1, further comprising:
determining, via the controller, whether a PCM reservoir of the HVAC circuit includes sufficient storage to store the heat generated by the temperature control unit; and
turning off the HVAC circuit when the controller determines that the PCM reservoir does not include sufficient storage to store the heat generated by the temperature control unit.

4. The method of claim 3, wherein turning off the HVAC circuit includes turning off an HVAC circuit compressor of the HVAC circuit.

5. The method of claim 1, wherein the heat generated by the temperature control unit is heat released from a refrigerant compressed by the HVAC circuit.

6. An HVAC circuit for a temperature control unit, the HVAC circuit comprising:
a phase change material (PCM) reservoir;
an HVAC compressor for compressing a first refrigerant;
an HVAC circuit expansion device configured to receive a liquid flow of the first refrigerant and restrict a flow of the first refrigerant as a gas;
an HVAC circuit condenser unit in thermal communication with the ambient environment outside of the temperature control unit and the internal space; and
an auxiliary circuit connected to the PCM reservoir, the auxiliary circuit consisting of:
an auxiliary compressor for compressing a second refrigerant;
an auxiliary condenser unit in thermal communication with the ambient environment outside of the temperature control unit and the internal space; and
an auxiliary expansion device configured to receive a liquid refrigerant flow of the second refrigerant and restrict a flow of the second refrigerant as a gas;
wherein the HVAC circuit is configured to monitor a heat release condition of the temperature control unit, wherein monitoring the heat release condition of the temperature control unit includes monitoring a location of the temperature control unit;
wherein the HVAC circuit is configured to operate in a heat storage mode, whereby heat generated by the HVAC circuit for providing temperature control within an internal space is stored in the PCM reservoir, wherein the HVAC circuit is configured to operate in a heat release mode, whereby the heat generated by the HVAC circuit for providing temperature control within the internal space is released to an ambient environment outside of the temperature control unit and the internal space, wherein the auxiliary compressor, the auxiliary condenser unit, the auxiliary expansion device and the PCM reservoir are connected in series when the HVAC circuit is configured to operate in a heat release mode, and wherein the auxiliary condenser unit is configured to release heat stored in the PCM reservoir to the ambient environment outside of the temperature control unit and the internal space.

7. The HVAC circuit of claim 6, further comprising:
an evaporator unit in thermal communication with the internal space;
a check valve connected to the PCM reservoir and the HVAC circuit expansion device,
wherein the HVAC circuit compressor, the PCM reservoir, the HVAC circuit expansion device and the evaporator unit are connected in series when the HVAC circuit is configured to operate in a heat storage mode, and
wherein the check valve is configured to direct the first refrigerant from the PCM reservoir to the HVAC circuit expansion device when the HVAC circuit is configured to operate in the heat storage mode.

8. The HVAC circuit of claim 6, further comprising:
an evaporator unit in thermal communication with the internal space;
a three-way valve connected to the HVAC circuit compressor; the PCM reservoir and the HVAC circuit condenser unit; and
an HVAC circuit check valve connected to the HVAC circuit condenser unit and the HVAC circuit expansion device;
wherein the HVAC circuit compressor, the HVAC circuit condenser unit, the HVAC circuit expansion device and the evaporator unit are connected in series when the HVAC circuit is configured to operate in a heat release mode, and
wherein the HVAC circuit condenser unit is configured to release heat to the ambient environment outside of the temperature control unit and the internal space,
wherein the three-way valve is configured to direct the first refrigerant to the PCM reservoir when the HVAC circuit is configured to operate in the heat storage mode,
wherein the three-way valve is configured to direct the first refrigerant to the HVAC circuit condenser unit when the HVAC circuit is configured to operate in the heat release mode, and
wherein the HVAC circuit check valve is configured to direct the first refrigerant from the HVAC circuit condenser unit to the HVAC circuit expansion device when the HVAC circuit is configured to operate in the heat release mode.

9. The HVAC circuit of claim 6, wherein the heat generated by the temperature control unit is heat released from the first refrigerant.

10. A temperature control unit for providing temperature control within an internal space, the temperature control unit comprising:
an HVAC circuit including:
a phase change material (PCM) reservoir;
an HVAC compressor for compressing a first refrigerant;
an HVAC circuit expansion device configured to receive a liquid flow of the first refrigerant and restrict a flow of the first refrigerant as a gas;
an HVAC condenser unit in thermal communication with the ambient environment outside of the temperature control unit and the internal space; and
an auxiliary circuit connected to the PCM reservoir, the auxiliary circuit consisting of:
an auxiliary compressor for compressing a second refrigerant,
an auxiliary condenser unit in thermal communication with the ambient environment outside of the temperature control unit and the internal space, and
an auxiliary expansion device configured to receive a liquid refrigerant flow of the second refrigerant and restrict a flow of the second refrigerant as a gas;
wherein the HVAC circuit is configured to monitor a heat release condition of the temperature control unit, wherein monitoring the heat release condition of the temperature control unit includes monitoring a location of the temperature control unit;
wherein the HVAC circuit is configured to operate in a heat storage mode, whereby heat generated by the HVAC circuit for providing temperature control within the internal space is stored in the PCM reservoir, and wherein the HVAC circuit is configured to operate in a heat release mode, whereby the heat generated by the HVAC circuit for providing temperature control within the internal space is released to an ambient environment outside of the temperature control unit and the internal space;
wherein the auxiliary compressor, the auxiliary condenser unit, the auxiliary expansion device and the PCM reservoir are connected in series when the HVAC circuit is configured to operate in a heat release mode; and
wherein the auxiliary condenser unit is configured to release heat stored in the PCM reservoir to the ambient environment outside of the temperature control unit and the internal space; and
a controller configured to control e HVAC circuit to operate in the heat storage mode and to operate in the heat release mode.

11. The temperature control unit of claim 10, wherein the HVAC circuit further includes:
an evaporator unit in thermal communication with the internal space; and
a check valve connected to the PCM reservoir and the HVAC circuit expansion device,
wherein the HVAC circuit compressor, the PCM reservoir, the HVAC circuit expansion device and the evaporator unit are connected in series when the HVAC circuit is configured to operate in a heat storage mode, and
wherein the check valve is configured to direct the first refrigerant from the PCM reservoir to the HVAC circuit expansion device when the HVAC circuit is configured to operate in the heat storage mode.

12. The temperature control unit of claim 10, wherein the HVAC circuit further includes:
an evaporator unit in thermal communication with the internal space;

a three-way valve connected to the HVAC circuit compressor, the PCM reservoir and the HVAC circuit condenser unit; and an HVAC circuit check valve connected to the HVAC circuit condenser unit and the HVAC circuit expansion device, wherein the HVAC circuit compressor, the HVAC circuit condenser unit, the HVAC circuit expansion device and the evaporator unit are connected in series when the HVAC circuit is configured to operate in a heat release mode, wherein the HVAC circuit condenser unit is configured to release heat to the ambient environment outside of the temperature control unit and the internal space, wherein the three-way valve is configured to direct the first refrigerant to the PCM reservoir when the HVAC circuit is configured to operate in the heat storage mode, wherein the three-way valve is configured to direct the first refrigerant to the HVAC circuit condenser unit when the HVAC circuit is configured to operate in the heat release mode, and wherein the HVAC circuit check valve is configured to direct the first refrigerant from the HVAC circuit condenser unit to the HVAC circuit expansion device when the HVAC circuit is configured to operate in the heat release mode.

13. The temperature control unit of claim 10, wherein the heat generated by the temperature control unit is heat released from the first refrigerant.

* * * * *